United States Patent
Hehl

[11] 3,761,198
[45] Sept. 25, 1973

[54] INJECTION MOLDING MACHINE
[76] Inventor: Karl Hehl, Siedlung 183, Lossburg/Wurttemberg, Germany
[22] Filed: Apr. 14, 1971
[21] Appl. No.: 133,829

[30] Foreign Application Priority Data
Apr. 24, 1970 Germany............... P 20 19 875.8

[52] U.S. Cl. .............................................. 425/192
[51] Int. Cl............................................. B28f 1/00
[58] Field of Search ............ 18/30 R, 30 JA, 30 LM, 18/30 LC, 30 LA, 30 LB, 30 LD, 30 LE, 30 LF, 30 LT, 30 LV, 30 Y, 30 PP, 42 D, DIG. 10, 16 R; 164/303; 425/190, 192, 450, 242

[56] References Cited
UNITED STATES PATENTS
| | | | |
|---|---|---|---|
| 2,447,101 | 8/1948 | Stock | 18/30 PP |
| 3,373,459 | 3/1968 | Hehl | 18/30 PP |
| 3,596,325 | 8/1971 | Hehl | 18/30 JA |

*Primary Examiner*—J. Spencer Overholser
*Assistant Examiner*—David S. Safran
*Attorney*—Spencer & Kaye

[57] ABSTRACT

An injection molding machine for processing synthetic and other similarly processed masses has a clamping unit with a casting mold defining a separating groove. Means are mounted on the clamping unit for selectively mounting injection units for operating into the separating groove in a direction parallel thereto, and for mounting special units. The mounting means has a carraige provided with connecting sleeves for receiving struts. A slide bearing is provided for clampably mounting the carriage in a slide guide defined on the clamping unit for movement in a direction parallel to the opening direction of the clamping unit. The connecting sleeves are two pairs of sleeves arranged in a crosswise manner so that one pair of sleeves lies in a plane parallel to the separating groove and the other pair of sleeves lies in a plane perpendicular to the separating groove. At least one additional slide guide is defined on the clamp unit for selectively holding the carriage in a position perpendicular to this position when held by the above-mentioned slide bearing.

21 Claims, 3 Drawing Figures

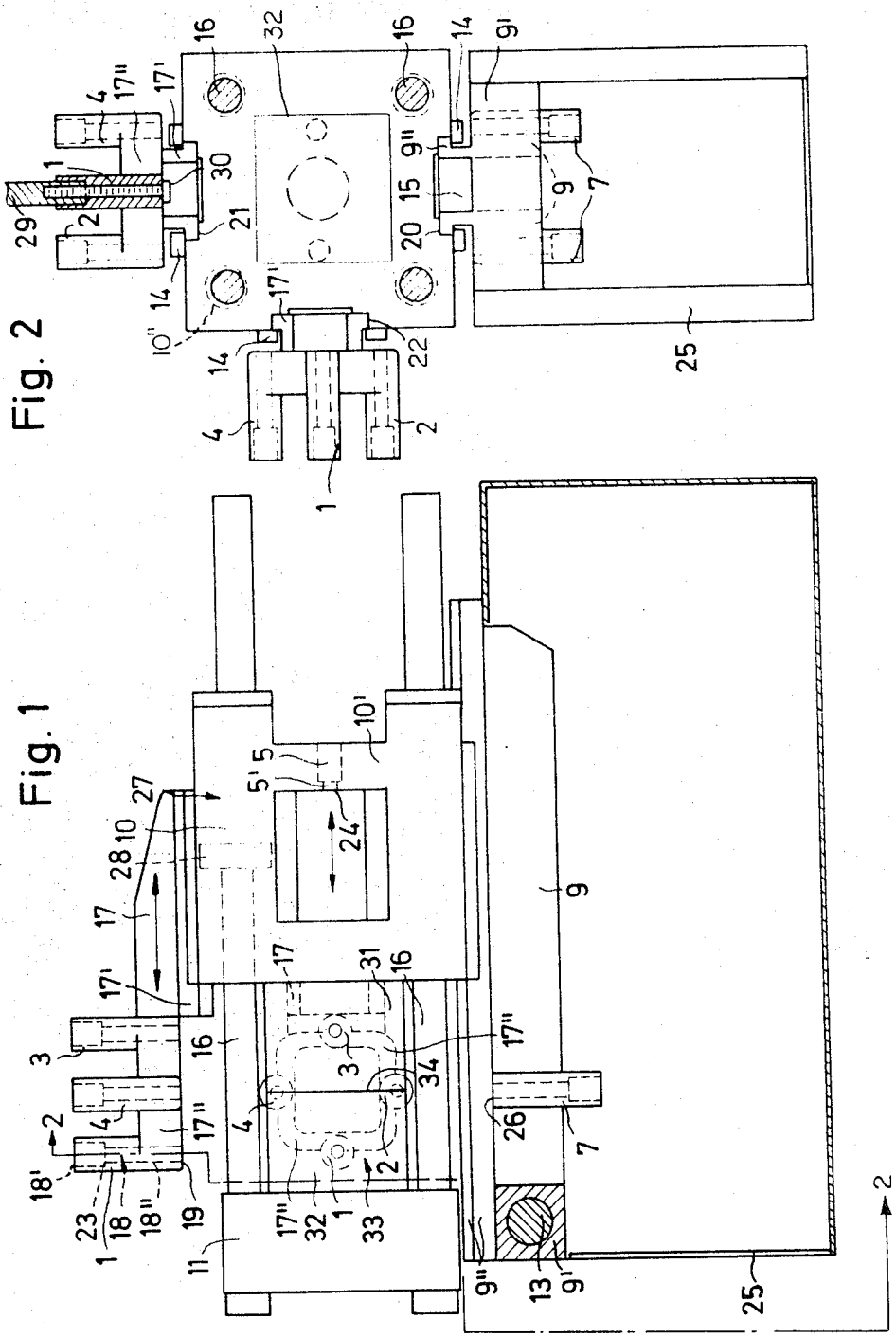

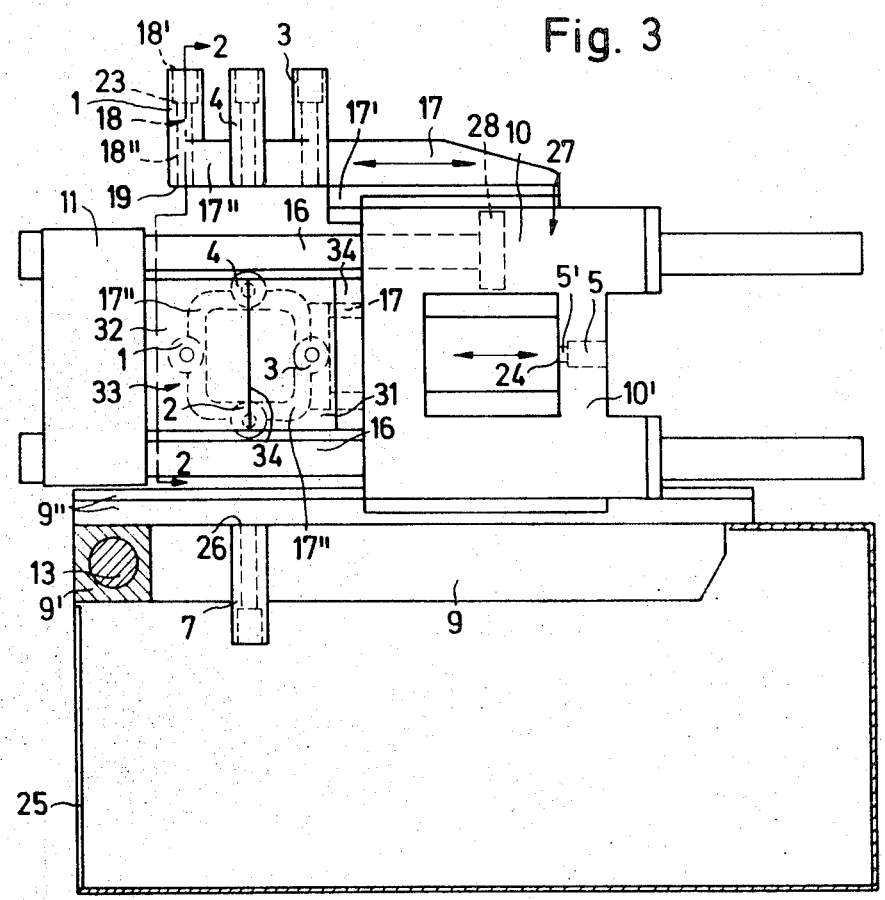

INJECTION MOLDING MACHINE

BACKGROUND OF THE INVENTION

The present invention relates to an injection molding machine for processing synthetics or other similarly processed masses. The machine has a clamping unit for the mold and at least one device having connecting parts disposed relative to one another to define the corners of a rectangle for the connection of a mold operating unit such as an injection unit operating into the separating groove, or for mounting a special unit such as a core puller, inserter, or the like. This device has a carriage provided with connecting sleeves for receiving struts. The carriage can be displaced with respect to and clamped at different positions parallel to the opening direction of the clamping unit in a slide formed in the clamping unit.

SUMMARY OF THE INVENTION

It is an object of the present invention to further develop a known injection molding machine of the type referred to above without a significant increase in the fabrication cost and in the weight of the unit, so that a mold operating unit such as a core puller, inserter, or the like can be mounted to a clamping unit of the machine, or an injection unit operating into a separating groove can selectively be connected to the respective clamping unit with an injection axis which is pivoted by 90° from the opening direction of the clamping unit without interfering with or hampering the supply of the synthetic raw material flowing into the mold cavity under the force of gravity and without significant interference from the electrical and hydraulic connections.

This object is accomplished according to the present invention by arranging two pairs of sleeves crosswise on a carriage, one pair of sleeves lying parallel to the separating groove of the mold or in the plane of this groove and the other pair of sleeves lying in a plane perpendicular thereto, and by providing at least a further slide bearing at the clamping unit for the selective mounting of the carriage in a position which is perpendicular to the carriage position in the other slide bearing.

Such a configuration makes it possible for an injection or special unit such as a core puller, inserter, or the like which is held by two supporting struts and operates into the separating groove to be connected on different sides of the clamping unit in such a manner that that side of the injection unit at which a granulate container is disposed when the unit is arranged vertically is always at the top when the unit is arranged horizontally. In this way, it is assured that the influx of synthetic material, which is effected by gravity, is not reduced or blocked completely by the appropriate change in position. With reference to the hydraulic or pneumatic and electrical connections and leads to the injection unit, the design according to the present invention also results in a substantial simplification of the contemplated selective transfers in position from the vertical to the horizontal of an injection or special unit operating into the separating groove, or of a transfer of an injection unit to different sides of the clamping unit. Advisably, the slide bearings for the carriage are inserted in perpendicularly disposed side surfaces of the stationary mold clamping plate of the clamping unit, which mold clamping plate has an either quadratic or rectangular cross section.

In a preferred embodiment of the present invention, the connecting sleeves are each provided with a continuous bore which opens at the rear side of the carriage frame.

BRIEF DESCRIPTION OF THE DRAWINGS

FIG. 1 is a schematic side elevation view of an injection molding machine with the machine base thereof shown in cross section and without control and drive devices accommodated therein.

FIG. 2 is a cross-sectional view taken generally along line 2—2 of FIG. 1 but with the mold removed.

FIG. 3 is a schematic side elevation view similar to FIG. 1, but showing the fixed mold half indirectly mounted on the pressure cylinder block.

DESCRIPTION OF THE PREFERRED EMBODIMENTS

FIG. 1 shows a pair of struts 9 pivotally connected to a machine base 25 in the area of a transverse member 9' by means of, for example, axle 13. The struts 9 are provided with angled slides 9'' which engage in a slide guide 20 defined in a stationary block 10 of a clamping unit 27. In this way, the clamping unit is axially adjustable, as well as pivotal by, for example, 90°. It may be clamped to the slides 9'' of the struts 9 in a predetermined axial position by means of suitable, known bolts 14. As can best be seen in FIG. 2, the angled arms of the slides 9'' are flush with the surface of block 10. For axial setting or displacement, a suitable, known screw drive (not shown) may be provided and have its screw arranged in area 15.

The block 10 of the clamping unit is provided with axial bores 10'' which form hydraulic pressure cylinders. These bores contain pistons 28 (only one of which is shown in the drawings) whose piston rods 16 hold a movable mold clamping plate 11. The block 10 is thus a fluid drive means for clamping together fixed and movable mold parts 31 and 32, respectively, of a mold 33.

Block 10 is a relatively large, shaped member which extends longitudinally in the direction of opening and closing of the mold 33 and forms the fluid pressure cylinders. In the embodiment shown in FIG. 1 of the drawings, block 10 also serves as the stationary mold clamping plate. The fixed mold half 31 may be indirectly mounted on block 10, however, as is shown in FIG. 3. In this embodiment, a separate stationary mold clamping plate 34 is fastened to block 10 in a known manner and mold half 31 is mounted on plate 34. Thus, mold half 31 may be mounted either directly or indirectly on block 10.

An example of the construction of such clamping units may be found in U.S. Pat. No. 3,564,658, issued Feb. 23, 1971, to Karl Hehl.

When injecting in a direction transverse to the separating groove 34 of the mold 33, the axially extended block 10 is penetrated by an injection cylinder (not shown) having supporting struts held by bores 5 defined in portions 10' of block 10. These plug-in bores 5 each have a starting section with a larger diameter dimensioned to hold the free ends of the struts (not shown) supporting the injection unit, and a section 5' with a smaller diameter which opens at the inner side of portion 10'. The supporting struts of the injection unit are provided at their free ends with concentric bores (not shown) each having internal screw threads.

When a supporting strut 29 is connected, a clamping bolt 30 is in threaded engagement with a respective one of all of these internal threads. One connected strut 29 is shown in FIG. 2. The bolt 30 is inserted coaxially through the bore section 5' and its head is abutted against surface 24 of the portion 10'. This arrangement is set out in more detail in the commonly owned, copending U.s. Pat. application of Karl Hehl, Ser. No. 133,828 filed Apr. 14, 1971, based on German Application P 20 20 060.6 of Apr. 29, 1970.

The injection molding machine according to the present invention may also have a device for mounting an injection unit operating into the separating groove and parallel thereto, or for mounting a special unit such as a core puller, an inserter, or the like. The device is provided with a carriage 17, which has connecting sleeves 1–4 for receiving struts. Slides 17' of a carriage 17 can be arranged or clamped rigidly in, for example, a slide guide 21 defined in the block 10. Slides 17' form slide bearings for engaging the guides 21. This permits carriage 17 to be displaced in a direction parallel to the opening direction of the clamping unit. At least one further slide guide 22 into which slides 17' of a carriage 17 can be selectively inserted is formed in an adjacent side surface of the block 10 — which has a quadratic or other rectangular cross section and defines a longitudinal axis parallel to the opening direction of the clamping unit. The side surface in which guide 22 is defined is perpendicular to the side surface of the block 10 provided with slide guide 21. Slides 17' of carriage 17 are connected to a frame 17'' having a rectangular cross section (FIG. 1) and arranged in the area of the mold. Connecting sleeves 1–4 are attached to frame 17'' in such a manner that two pairs of opposed sleeves are disposed crosswise to one another, one pair of sleeves being disposed parallel to the separating groove of the mold or in the plane of the separating groove and the other pair of sleeves being disposed in a plane which is perpendicular thereto.

If an injection unit is mounted in slide guide 22, the connecting sleeves 1–4 are disposed perpendicular to their position in slide guide 21. The slide guides 21 and 22 are preferably worked so deeply into the surface of the block 10 that the angled arms of the slides 17' are flush with the surface of the mold carrier. The carriage 17, inclusive of its slides 17', frame 17'' and connecting sleeves 1–4 may be fabricated in a known manner as a unitary member. The connecting sleeves 1–4 are provided with continuous bores 18 which end at the surface 19 of frame 17''. Bores 18 have a section 18' at the free connecting end which is dimensioned for receiving the struts of an injection unit. This section 18' forms an annular shoulder 23 at the transition point to a bore section 18'' with a smaller diameter than that of section 18'.

Sleeve-type connecting members 7 may be connected to the struts 9 and are formed to correspond to the connecting sleeves 1–4 of carriage 17. As mentioned above, each of the supporting struts of all of the injection units and special units employed is provided at its free end with a coaxial bore for holding a coaxially arranged clamping machine bolt 30 whose head abuts the surface 19 of the carriage frame 17'', the surface 24 of portion 10'', or surface 26 of the connecting members 7, as the case may be.

It will be understood that the above description of the present invention is susceptible to various modifications, changes and adaptations, and the same are intended to be comprehended within the meaning and range of equivalents of the appended claims.

I claim:

1. In an injection molding machine for processing synthetic and other similarly processed masses and having a clamping unit with an opening direction and a casting mold defining a separating groove, and means mounted on said clamping unit for selectively mounting a mold operating unit for operating into the separating groove in the direction parallel thereto, the improvement comprising said mounting means having a carriage provided with connecting sleeves for receiving the struts of an operating unit to be mounted, said carriage being mounted to a slide bearing which is mounted in a slide guide defined on said clamping unit for movement in a direction parallel to the opening direction of said clamping unit, the connecting sleeves being two pairs of sleeves arranged in a crosswise manner so that one pair of sleeves lies in a plane parallel to the separating groove and the other pair of sleeves lies in a plane perpendicular to the separating groove, and at least one additional slide guide defined on said clamping unit for selectively holding said carriage in a position perpendicular to its position when held by said slide bearing.

2. The injection molding machine defined in claim 1 wherein said one pair of sleeves lies in the parting plane and said mold operating unit comprises a core puller.

3. The injection molding machine defined in claim 2 wherein said clamping unit has a block having a rectangular cross section and lateral outer surfaces which are perpendicular to one another and wherein the slide guides are defined in respective ones of the lateral surfaces.

4. The injection molding machine defined in claim 3 wherein said block defines a longitudinal axis parallel to the opening direction of said clamping unit and a plurality of bores defined parallel to said axis, and further including a piston arranged in a respective one of each of said bores, a movable mold clamping plate, each piston having a piston rod which is arranged to extend outwardly from said block and wherein said movable clamping plate is mounted on said piston rods.

5. The injection molding machine defined in claim 4, further including a frame member mounted on said carriage to extend into an area adjacent the casting mold and said connecting sleeves having free connecting ends mounted on said frame for receiving the struts of the unit to be mounted.

6. The injection molding machine defined in claim 5 wherein said carriage has slides defined by angled arms which are arranged in a respective one of said slide guides to mount said carriage on said block, further including means having screw threads for clamping said slides to said block, and wherein said slide guides are worked into the respective lateral surfaces of said block to a predetermined depth that permits the outer surface of said angled arms to be flush with the respective lateral surface.

7. The injection molding machine defined in claim 6 wherein said frame member has an arm for each of said connecting sleeves, and wherein a connecting sleeve is arranged in the center portion of a respective one of each of these arms.

8. The injection molding machine defined in claim 7 wherein said carriage, said slide, said frame member, and said connecting sleeves are a unitary member.

9. The injection molding machine of claim 8 wherein each connecting sleeve defines a continuous bore which has an opening adjacent said frame member and an opening at the free connecting end of each sleeve.

10. The injection molding machine defined in claim 9 wherein said continuous bore has two bore sections, one section arranged adjacent said frame and the other section arranged at the free connecting end of the sleeve, said section at the free connecting end having a larger diameter than said section adjacent said frame member, and wherein the transition point between said sections forms an annular shoulder.

11. The injection molding machine defined in claim 10 wherein said block defines an opening for receiving an injection cylinder operating transversely to said separating groove and has portions arranged adjacent said lateral surfaces and defining a plurality of continuous connecting bores for receiving the supporting struts of an injection unit.

12. The injection molding machine defined in claim 11 wherein the continuous bores defined in said portions each have two sections arranged and dimensioned in the manner of the bores of said connecting sleeves.

13. The injection molding machine defined in claim 12, further including a machine base, and means for mounting said clamping unit to said machine base for 90° pivotal movement.

14. The injection molding machine defined in claim 13 wherein the pivotal movement means has a pair of struts and an axle, and wherein said struts have slides and said block defines a further slide guide for receiving the slides of said pair of struts, so that the position of said clamping unit with respect to said pair of struts may be adjusted in the direction perpendicular to said separating groove.

15. The injection molding machine defined in claim 14, further including a connecting member connected to a respective one of both of said pair of struts for selectively mounting injection and special units for operating into the separating groove in the direction parallel thereto.

16. The injection molding machine defined in claim 15 wherein the connecting members have the form of sleeves and define continuous bores having two sections arranged and dimensioned in the manner of said connecting sleeves.

17. The injection molding machine defined in claim 16, further including struts for supporting the injection and special units to be mounted, each of the supporting struts having a free connecting end defining a threaded bore which is coaxial with said supporting strut, and further including a bolt for threadingly engaging said screw threads defined by said bolt, each of said connecting sleeves, bores of said portion, said connecting members defining a surface adjacent the opening of said continuous bore at the section thereof having the smaller diameter, and said bolt having a head which abuts the respective surface when a supporting strut is clamped into position.

18. The injection molding machine defined in claim 17, wherein said block is the stationary mold clamping plate.

19. The injection molding machine defined in claim 17, further including a stationary mold clamping plate mounted on said block for mounting a fixed mold half of said casting mold.

20. The injection molding machine defined in claim 1 wherein said mold operating unit comprises an injection unit.

21. The injection molding machine defined in claim 1 wherein said mold operating unit comprises a core inserter.

* * * * *